Oct. 18, 1927.
C. B. GRAY
1,646,145
MACHINE FOR CUTTING SHEET FORM MATERIAL
Filed June 19, 1923   3 Sheets-Sheet 1
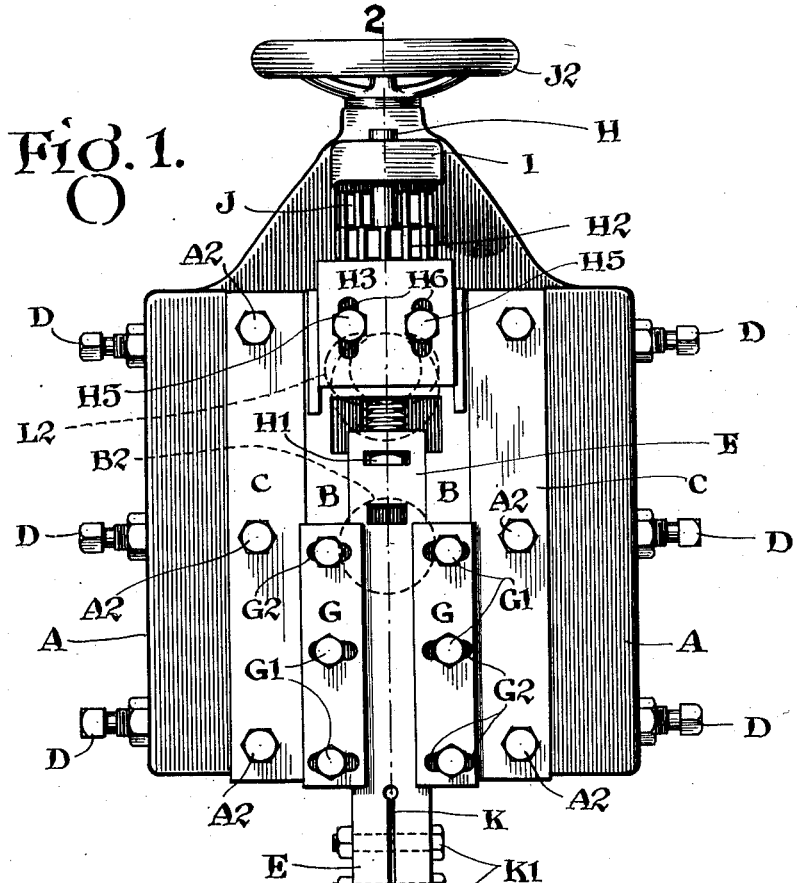
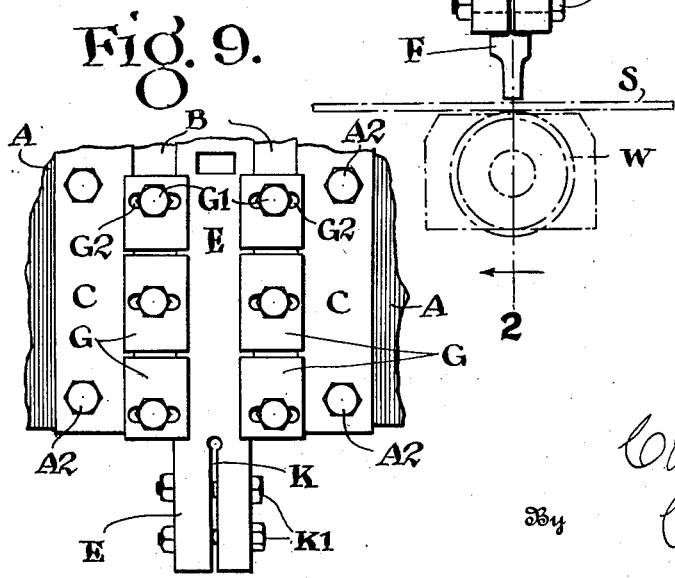
Inventor
Charles B. Gray
By Cyrus Kehr
Attorney

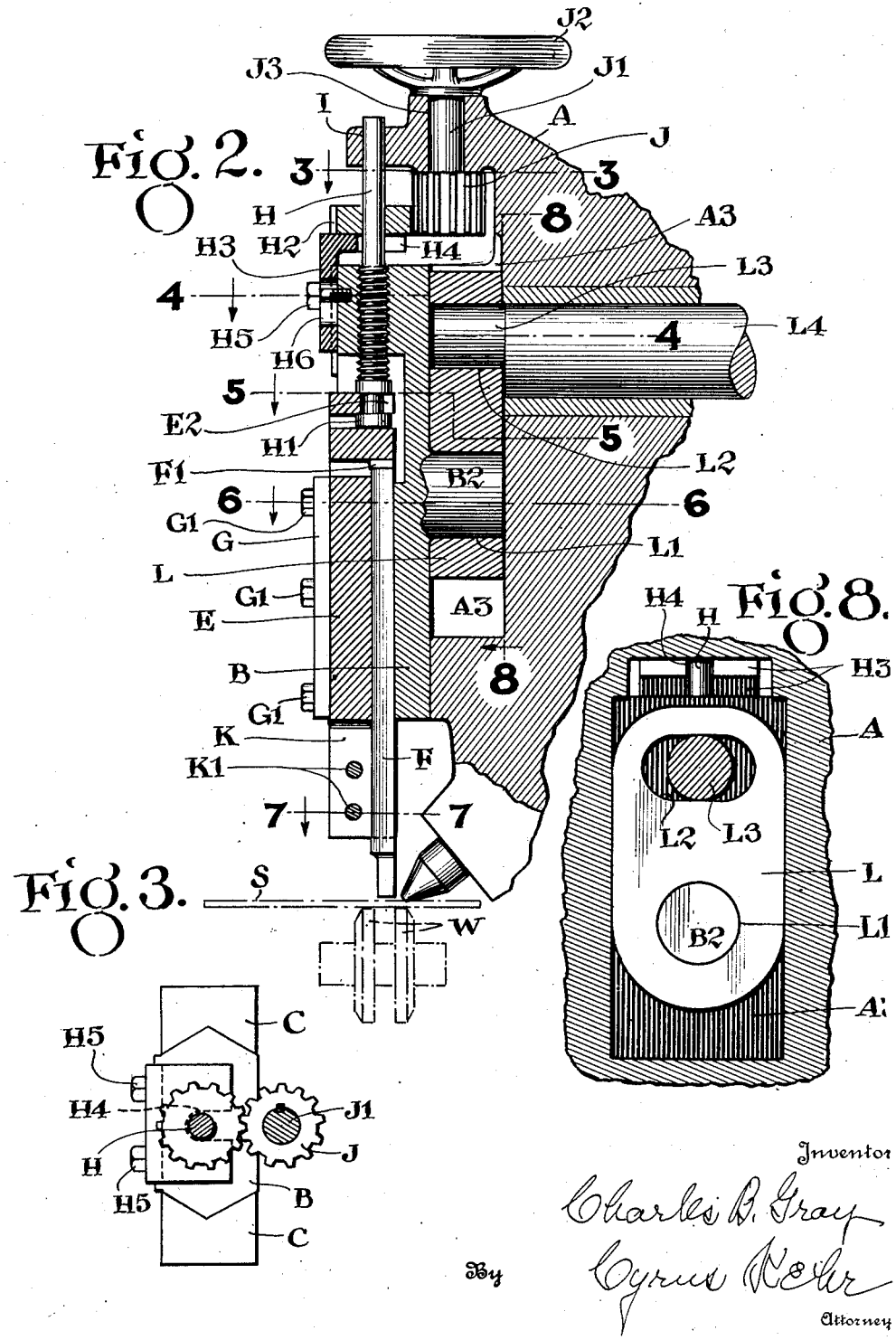

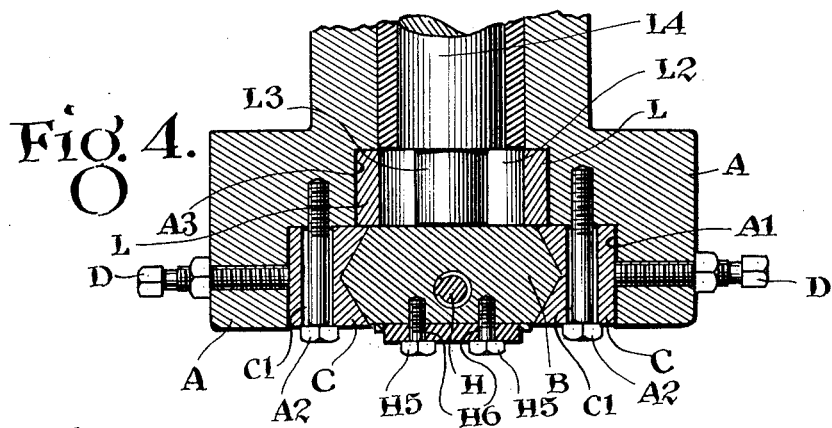
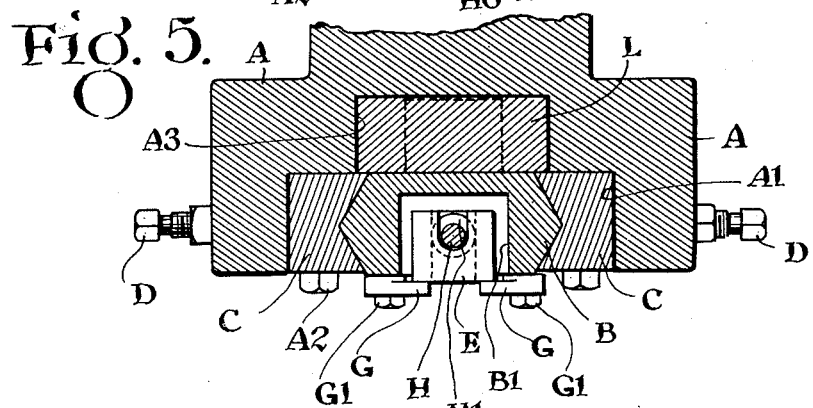
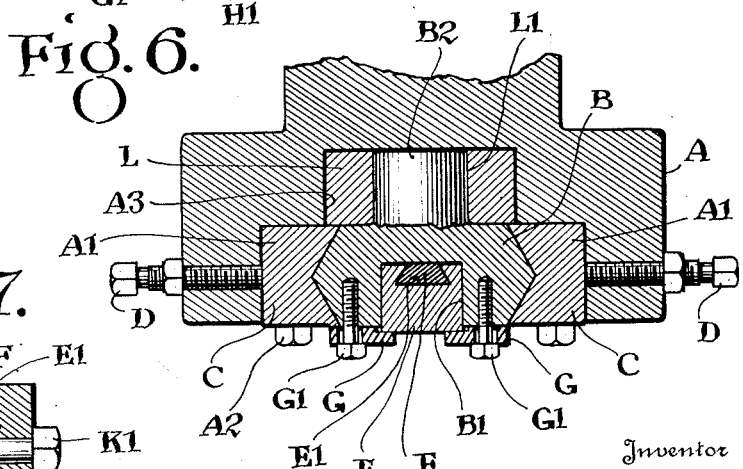
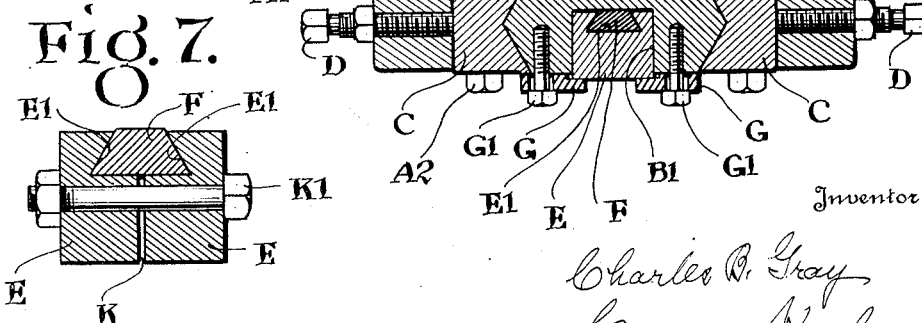

Patented Oct. 18, 1927.

1,646,145

UNITED STATES PATENT OFFICE.

CHARLES B. GRAY, OF PHILADELPHIA, PENNSYLVANIA.

MACHINE FOR CUTTING SHEET-FORM MATERIAL.

Application filed June 19, 1923. Serial No. 646,411.

This invention relates particularly to machines for cutting sheet-form material by means of co-acting cutters located above and below the sheet which is to be cut, the upper cutter being reciprocatory in a line which is perpendicular to the plane of the sheet. For such a machine I refer to Letters Patent of the United States, No. 1,098,376 and No. 1,098,377, granted to me June 2, 1914.

The object of this invention is to provide another form of means for reciprocably supporting the upper cutter.

In the accompanying drawings,

Fig. 1 is an elevation looking toward the head of the machine from the left;

Fig. 2 is an upright section on the line, 2—2, of Fig. 1, looking toward the left;

Fig. 3 is a horizontal section on the line, 3—3, of Fig. 2;

Fig. 4 is a horizontal section on the line, 4—4, of Fig. 2;

Fig. 5 is a horizontal section on the line, 5—5, of Fig. 2;

Fig. 6 is a horizontal section on the line, 6—6, of Fig. 2;

Fig. 7 is a horizontal section on the line, 7—7, of Fig. 2;

Fig. 8 is an upright section on the line, 8—8, of Fig. 2, looking toward the left;

Fig. 9 is a detail view showing another form of guide plates for confining the cutter holder in its path.

Referring to said drawings, the front face of the head, A, is provided with an upright channel, $A^1$, which receives the upright reciprocatory cross head or plunger, B, and the guide way plates, C. The guide way plates receive the side edges of the plunger, and the bolts, $A^2$, extend through larger openings, $C^1$, whereby the plates, C, are bound to the head. Bolts, D, are for adjusting the plates, C, horizontally toward the plunger. The front face of the plunger, B, has a channel, $B^1$, to receive the cutter holder, E.

The cutter holder, E, is quadrilateral in cross-section and is adjustable up and down in the plunger. The inner or right hand face of the cutter holder has a channel, $E^1$, to receive the cutter or tool, F. Guide plates, G, keep the cutter holder in the channel and confine the holder to up and down sliding. For this purpose, the plates, G, project over the outer face of the cutter holder. The plates, G, are held by the cap screws, $G^1$, passing through elongated holes, $G^2$, in the plates. When it is desired to remove the cutter holder and the cutter, the cap screws, $G^1$, are loosened enough to allow sliding the plates, G, horizontally far enough to clear the outer face of the cutter holder. The plates, G, make a sliding fit with the tool holder.

The upper end of the cutter holder is held on the plunger by a screw shaft, H, which has a head, $H^1$, reaching into the horizontal recess, $E^2$, of the cutter holder. The screw shaft is threaded in the upper end of the plunger, B. The upper end of the screw-shaft rests slidably in a bearing, I, on the head, A. On the screw shaft, below the bearing, I, is fixed a spur gear wheel, $H^2$. A bracket, $H^3$, is seated on the upper end of the plunger and has an upper, horizontal fork, $H^4$, receiving the screw shaft below the spur gear wheel, $H^2$. Bolts, $H^5$, extend through elongated holes, $H^6$, in the bracket and into the plunger, B, for adjustably holding the bracket. This bracket is to be set for limiting the downward movement of the wheel, $H^2$, and the screw shaft relative to the plunger. The wheel, $H^2$, meshes with a spur gear wheel, J, which is fixed on an upright shaft, $J^1$, on the upper end of which is a hand wheel, $J^2$. The shaft, $J^1$, extends through a bearing, $J^3$, in the head, A. By turning the hand wheel, the spur gear wheel, J, is made to turn the spur gear wheel, $H^2$, and the screw shaft, H. The spur gear wheel, J, is made long enough to allow the spur gear wheel, $H^2$, to slide on the wheel, J, during the adjustment of the shaft, H, and also during the reciprocation of the plunger while the machine is working.

The lower end of the cutter holder, E, is split at K, in an upright plane cutting the channel, $E^1$, and horizontal cross bolts, $K^1$, extend through the holder beside the channel, $E^1$. By this means the two parts of the holder are drawn toward each other and firmly bound to the cutter.

The upper end of the cutter, F, may rest endwise against the cross wall in the upper part of the cutter holder. But if the tool is too short to have its lower end in position and rest against said wall, any number of filling pieces, $F^1$, may be inserted above the tool, by which means the cutter is given approximately its precise position. Then, by turning the wheel, $J^2$, after loosening the bracket, H³, the holder is moved slightly up or down to put the lower end of the cutter into its precise position relative to the lower wheel-form cutters, W. Then the bracket, H³, is moved upward against the spur gear wheel, H², and secured by means of the bolts, H⁵. This position of the cutter holder is then maintained until the length of the tool becomes changed by wearing or regrinding, etc., which will require a resetting according to the procedure above described.

On the inner face of the plunger is a wrist, B², which extends into a bearing, L¹, in the plate-form pitman, L, which is slidable in the upright channel, A³, formed in the head, A. In the upper part of the pitman is a horizontal slot, L², into which extends the crank, L³, on the horizontal drive shaft, L⁴, which is rotatable in the head, A.

When the bracket, H³, has been set, the shaft, H, may be turned to raise the cutter holder to bring the lower end of the cutter high enough for the insertion of the sheet, S, of material to be cut or the insertion of a master template having an opening within which the cutter is to work. In connection with the use of such a template, it is to be observed that during work the upper cutter rises only high enough to clear the bracket and stays below the upper face of the template. The throw of the crank which reciprocates the plunger is only long enough to drive the cutter through the sheet and thereafter raise it just above the sheet and not above the upper face of the template.

When the sheet or the template or both have been inserted, the screw shaft is to be again moved downward as far as the bracket, H³, will permit. Thereby the holder is returned to its exact position in the plunger.

The plates, G, permit quick removal of the cutter holder from the plunger. It is not necessary to remove the bolts, G¹, nor the plates, G. It is only necessary to loosen the bolts, G¹, and then slide the plates sidewise until the cutter holder is free.

In Fig. 9, three plates, G, are used at each side of the cutter holder.

After the plates, G, have been thus shifted, the holder may be lifted out of the plunger, the upper part of the holder detaching itself from the screw shaft by the horizontal lifting of the holder.

I claim as my invention,

1. In a machine of the kind described, the combination with the head having an upright channel, of a plunger confined in said channel for up-and-down reciprocation, means for reciprocating said plunger, a cutter-holder slidable up and down on the plunger, adjustable means for supporting the holder at different elevations relative to the plunger, means including two cog wheels, one being slidable on the other, for adjusting said adjustable means, adjustable means on the plunger for limiting the downward movement of the holder, and a cutter on the holder, substantially as described.

2. In a machine of the kind described, the combination with the head having an upright channel, of a plunger confined in said channel for up-and-down reciprocation, means for reciprocating the plunger, a cutter holder slidable up and down on the plunger, a cutter on the holder, a screw shaft engaging the plunger and the holder, a cog wheel fixed on the screw shaft above the plunger, and a bracket supported by the plunger and reaching into the path of said wheel below said wheel, substantially as described.

3. In a machine of the kind described, the combination with the head having an upright channel, of a plunger confined in said channel for up-and-down reciprocation, means for reciprocating the plunger, a cutter holder slidable up and down on the plunger, a cutter on the holder, a screw shaft engaging the plunger and the holder, a wheel fixed on the screw shaft above the plunger, a bracket supported by the plunger and reaching into the path of said wheel below said wheel, and manually actuated means on the head for rotating said screw shaft, substantially as described.

4. In a machine of the kind described, the combination with the head having an upright channel, of a plunger confined in said channel for up-and-down reciprocation, means for reciprocating said plunger, a cutter-holder slidable up and down on the plunger, adjustable means for supporting the holder at different elevations on the plunger, a cutter on the holder, and laterally adjustable members supported on the plunger and reaching over the outer face of the holder for confining the holder to up-and-down movement on the plunger, substantially as described.

5. In a machine of the kind described, the combination with the head having an upright channel, of a plunger confined in said channel for up-and-down reciprocation, means for reciprocating the plunger, a cutter holder slidable up and down on the plunger, an upright screw shaft engaging the plunger and the holder, an upright shaft supported in the head for rotation and against endwise movement, a gear wheel on said shaft, a gear wheel fixed on the screw shaft and meshing with the other gear wheel and slidable thereon during reciprocations of the plunger, and a cutter on the holder, substantially as described.

6. In a machine of the kind described, the combination with the head having an upright channel, of a plunger confined in said channel for up-and-down reciprocation, means for reciprocating the plunger, a cutter holder slidable up and down on the plunger, an upright screw shaft threaded in the plunger and engaging the holder, an upright shaft supported in the head for rotation and against endwise movement, a gear wheel on said shaft, a gear wheel fixed on the screw shaft and meshing with the other gear wheel and slidable thereon during reciprocations of the plunger, and a cutter on the holder, substantially as described.

7. In a machine of the kind described, the combination with the head having an upright channel, of a plunger confined in said channel for up-and-down reciprocation, means for reciprocating said plunger, a cutter-holder on the plunger, and members supported on the plunger and extending over a part of the holder for confining the holder on the plunger and adjustable sidewise to permit removal of the holder, substantially as described.

8. In a machine of the kind described, the combination with the head having an upright channel, of a plunger confined in said channel for up-and-down reciprocation, means for reciprocating said plunger, a cutter-holder on the plunger, and laterally adjustable members supported on the plunger and reaching over the outer face of the holder for confining the holder on the plunger, substantially as described.

9. In a machine of the kind described, the combination with the head having an upright channel, of a plunger confined in said channel for up-and-down reciprocation, means for reciprocating said plunger, a cutter-holder on the plunger, horizontally slotted plates resting against the plunger and reaching across a part of the outer face of the holder, and bolts extending through the slots of the plates into the plunger for binding said plates to the plunger, substantially as described.

In testimony whereof I have signed my name this 18th day of June, in the year one thousand nine hundred and twenty-three.

CHARLES B. GRAY.